United States Patent [19]
Chiappe et al.

[11] Patent Number: 6,042,325
[45] Date of Patent: Mar. 28, 2000

[54] HIGH CAPACITY AUTOMATED WORKLOAD REGULATOR

[75] Inventors: Wayne T. Chiappe, Hinsdale, Ill.; Randy Warren Gasquoine, Stockton, Calif.

[73] Assignee: Sardee Industries, Oak Brook, Ill.

[21] Appl. No.: 08/462,133

[22] Filed: Jun. 5, 1995

Related U.S. Application Data

[63] Continuation of application No. 08/203,871, Mar. 1, 1994, abandoned, which is a continuation of application No. 08/000,594, Jan. 5, 1993, abandoned, which is a continuation of application No. 07/787,730, Nov. 4, 1991, abandoned, which is a continuation of application No. 07/550,476, Jul. 10, 1990, abandoned.

[51] Int. Cl.[7] ...................................................... B65G 65/00
[52] U.S. Cl. ................ 414/416; 414/331.01; 414/222.01
[58] Field of Search ........................................ 414/416, 331, 414/222, 225, 788.4, 792.9, 795.3, 796.9, 798.2, 798.3, 798.9, 331.01, 222.01

[56] References Cited

U.S. PATENT DOCUMENTS

| | | | |
|---|---|---|---|
| 4,362,454 | 12/1982 | Kripzak | 414/331 X |
| 4,506,455 | 3/1985 | Rossi | 414/331 X |
| 4,808,057 | 2/1989 | Chiappe et al. | 414/416 X |
| 4,946,340 | 8/1990 | Murphy et al. | 414/416 X |
| 4,979,870 | 12/1990 | Mojden et al. | 414/416 X |
| 4,995,785 | 2/1991 | Platteschorre | 414/331 X |

FOREIGN PATENT DOCUMENTS

| | | | |
|---|---|---|---|
| 230903 | 12/1984 | Japan | 414/331 |
| 140420 | 6/1986 | Japan | 414/331 |
| 166433 | 7/1986 | Japan | 414/331 |

*Primary Examiner*—Steven A. Bratlie
*Attorney, Agent, or Firm*—Vedder, Price, Kaufman & Kammholz

[57] ABSTRACT

A new and improved automated workload balancer for automatic regalating a flow of articles between a first work station whereat a plurality of strings of articles are produced at a first variable cyclic operating rate, and a second downstream work station whereat an operation is performed on the plurality of strings of produced articles at a second variable cyclic operating rate, such that at least one of the work stations may continue in uninterrupted operation and at a desired operating rate when the rate of operation of the work station is temporarily varied or interrupted.

1 Claim, 14 Drawing Sheets

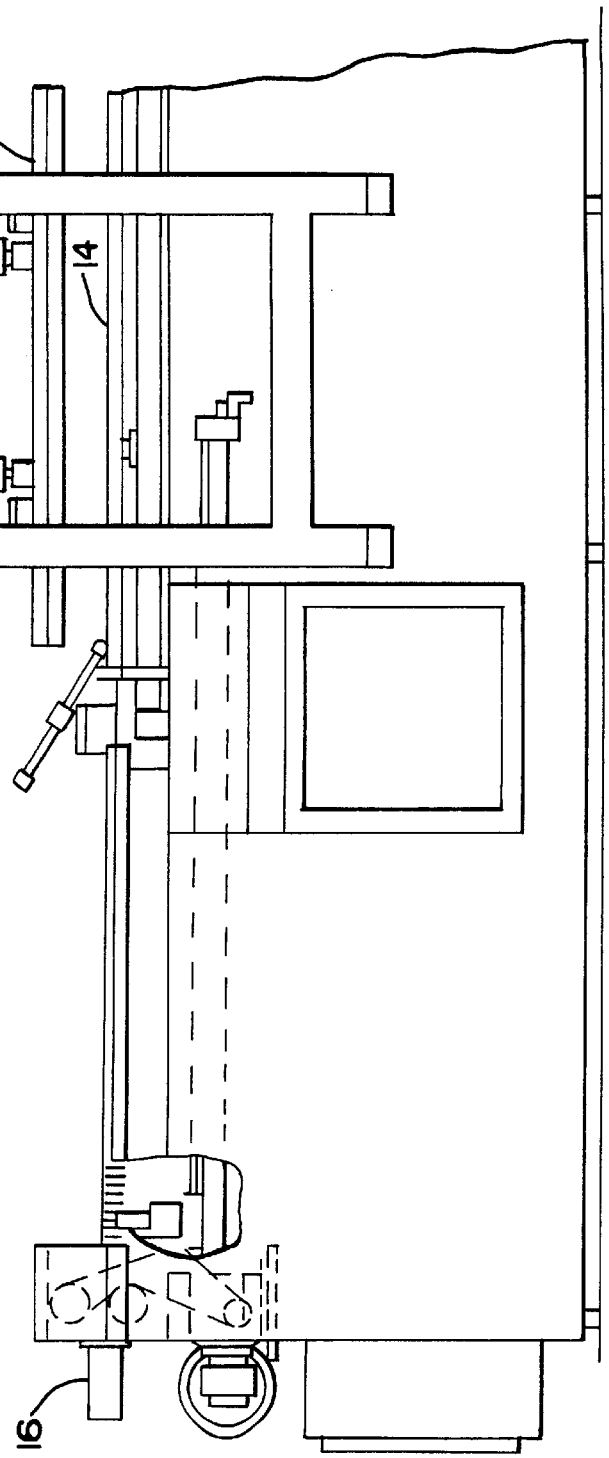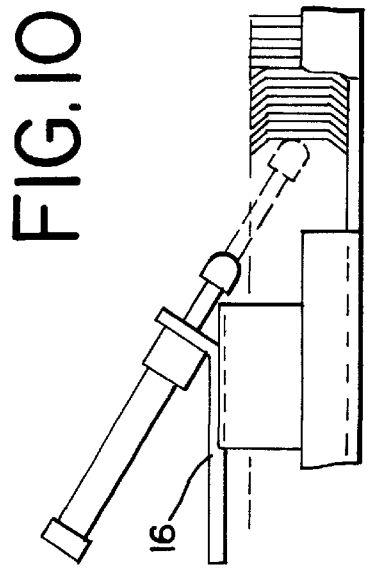

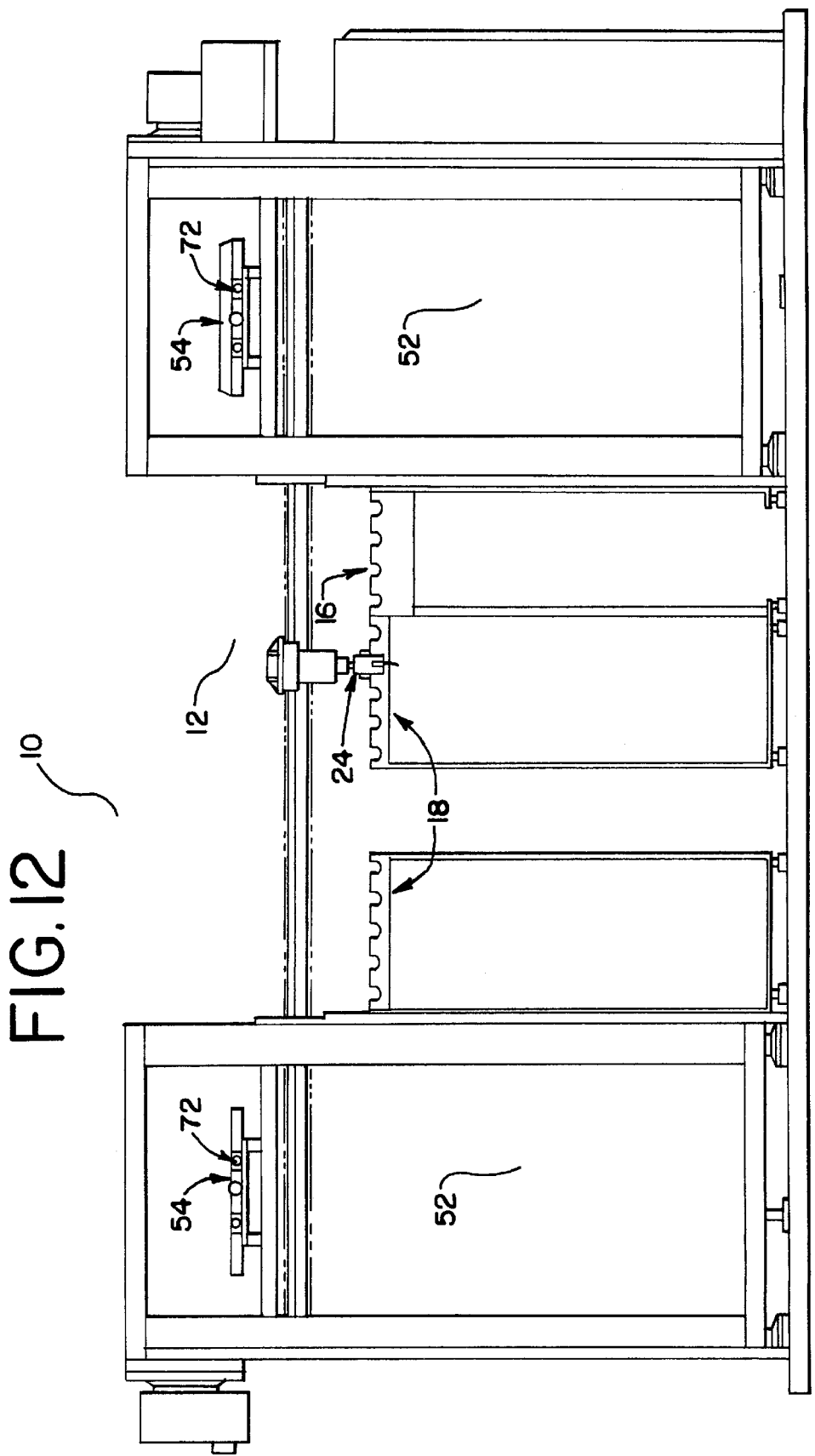

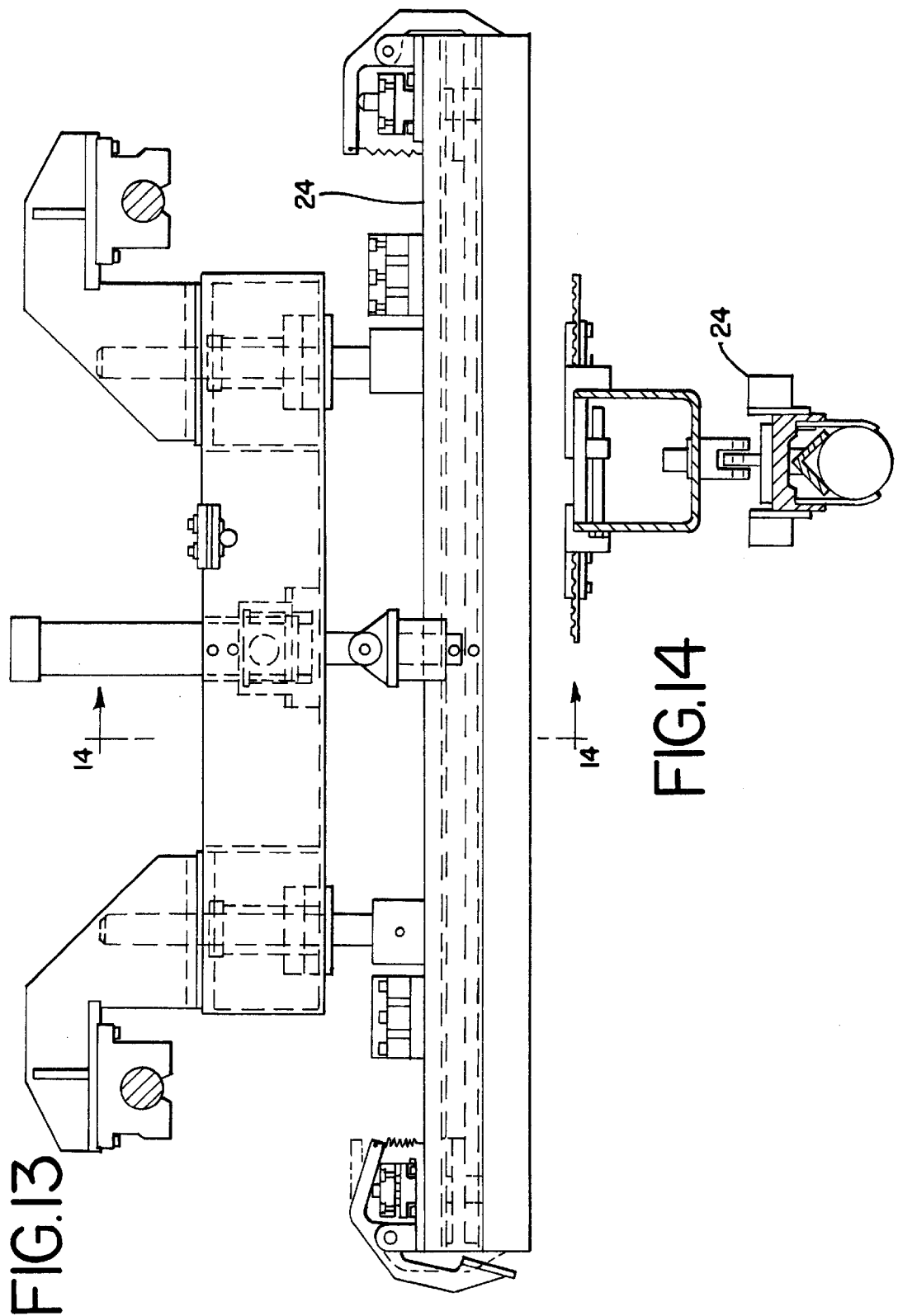

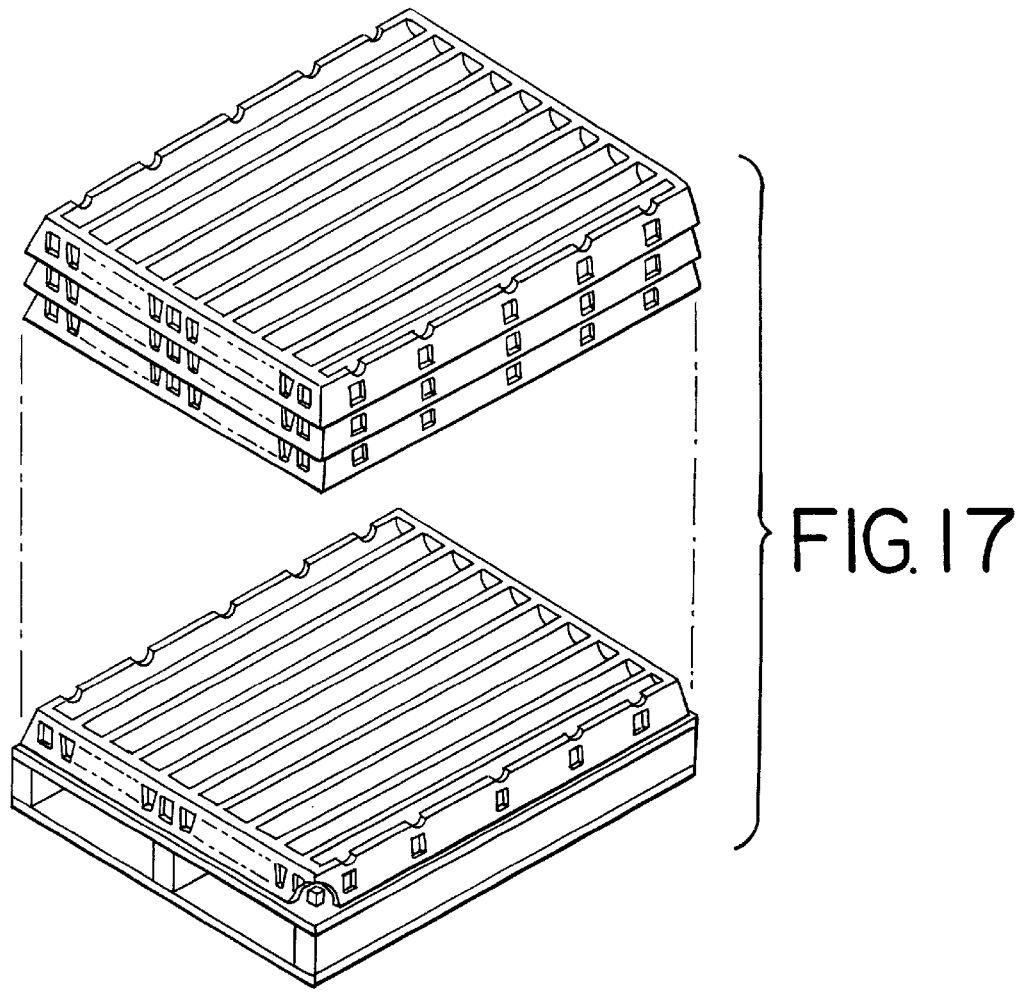
FIG. 17
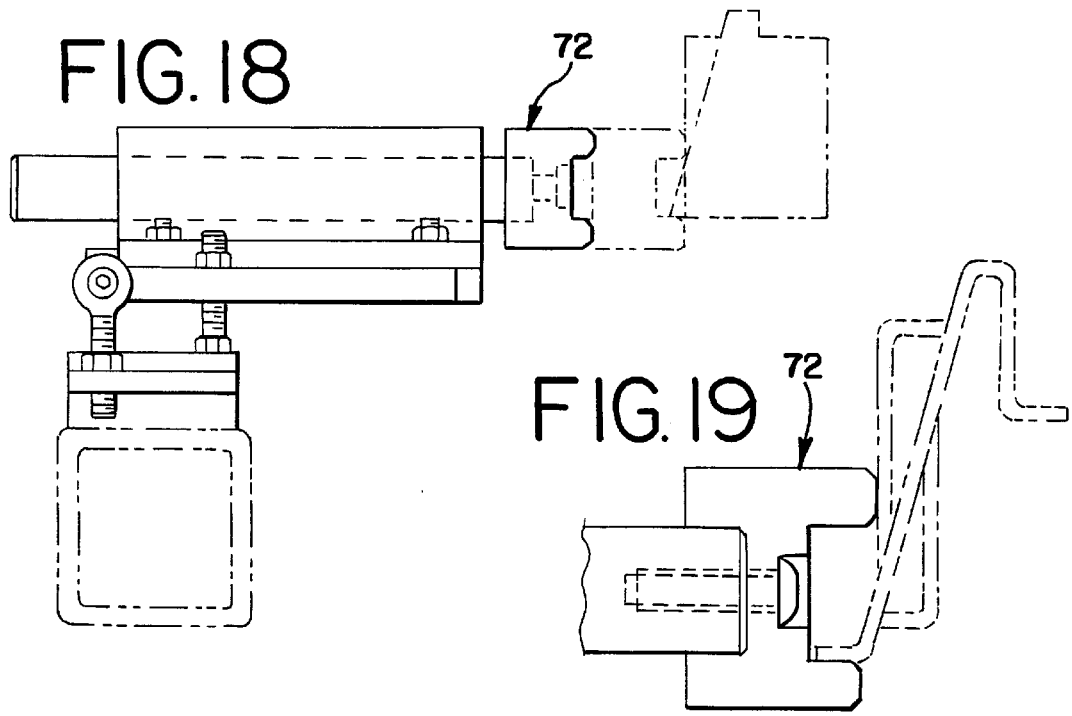
FIG. 18
FIG. 19

HIGH CAPACITY AUTOMATED WORKLOAD REGULATOR

This application is a continuation, of application Ser. No. 08/203,871, filed Mar. 1, 1994, which is a continuation of application Ser. No. 08/000,594, filed Jan. 5, 1993, which is a continuation of application Ser. No. 07/787,730, filed Nov. 4, 1991, which is a continuation of application Ser. No. 07/550,476, filed Jul. 10, 1990 all abandoned.

BACKGROUND OF THE INVENTION

The present invention relates to apparatus and methods for continuously, automatically and dynamically regulating the Flow of manufactured articles in an automated multi-step manufacturing setting. More particularly, it relates to a new and improved automated workload balancer for use in producing beverage containers having a redesigned transfer head and storage container elevator apparatus capable of increasing can end handling rates to above about 5,000 ends per minute, and preferably to between about 7,500 to about 10,000 ends per minute.

An automated workload regulator apparatus for use in a bar and beverage can making operations is known from U.S. Pat. No. 4,808,057 issued Feb. 28, 1989 and a related pending application Ser. No. 287,479, filed Dec. 20, 1988 now U.S. Pat. No. 4, 983, 095, both of which are assigned to the same assignee as the present invention. In accordance with the apparatus defined in this patent and application, the articles are can lids or ends which are stamped from a roll of sheet metal stock at a first stamping operation and work station. The stamped can ends are transferred to successive downstream workstations where a number of subsequent manufacturing operations are or may be performed including: a shaping operation whereat the curled edge portion is imparted to each can end which is subsequently used in securing the can end to a can body; liner operations, wherein various coating compounds are applied to the inside surface of the can end preparatory to sealing of the can end to a can body; drying operations, to dry or cure the coatings applied in the liner operations; conversion press operations, wherein the easy open score lines and pop-top tab rings are stamped and affixed to each lid, respectively; packaging operations, wherein a predetermined number of can ends are packaged in a tubular paper sleeve wrapper; and finally, palletizing and shrink-wrapping operations, wherein sticks or packaged sleeves of can ends are stacked onto a pallet and wrapped in heat shrink plastic wrap for safe-keeping in temporary storage.

The balancer apparatus is positioned between two adjacent work stations to promote maximum through-put or output from the overall manufacturing operation by permitting uninterrupted operation of at least one of the workstations at its desired operating rate even though the other workstation is experiencing an intermittent or variable operating rate.

The apparatus described in the aforementioned includes a transfer station having an associated inbound staging area, an outbound staging area and a storage area. As shown in the patent drawings, the inbound staging area and the outbound staging area each comprise a plurality of adjacent parallel lanes and preferably the inbound and outbound staging areas are disposed in adjacent, side by side relation in a common horizontal plane extending through the transfer station. The storage area is defined by a horizontal conveyor extending parallel to the staging areas but spaced vertically above the staging areas and spaced rearwardly from the staging areas so as to be in stepped relation therewith, like the keyboards of a church organ, for example. The horizontal conveyor is designed to receive and index a storage tray having a plurality of parallel troughs or receptacle portions each for receiving a stick of can ends, in either of two horizontal directions, e.g. into or away from the transfer station.

A transfer head having gripping and releasing means for grabbing a stick of can ends is positioned at the transfer station and is capable of a limited range of movement along the three axes in the transfer station. The transfer head can move a stick of ends from an inbound lane at the inbound staging area to an outbound lane at the outbound staging area or it can move the stick from the inbound lane to designated empty trough in the storage tray positioned at a given central location in the transfer station. In addition, the transfer head may grip a stick of can ends from a trough in the storage tray and deposit it in an outbound lane.

The balancer apparatus described in this patent further includes an empty container magazine and a full container magazine located at the opposed ends of the horizontal conveyor, respectively. Each magazine includes elevator means for upstacking or downstacking a given number of storage trays and for cooperatively loading them one at a time from magazine storage onto the horizontal conveyor for indexing through the transfer station.

In accordance with the apparatus and its mode of operation, a number of sensors and a controller module determine the cumulative inbound rate of can ends or rather the sticks of can ends being deposited in the lanes at the inbound staging area. Moreover, the controller also determines a cumulative outbound rate which is the rate at which sticks of ends are being withdrawn from the outbound lanes of the outbound staging area. The transfer head moves one group or stick of ends at a time and removes sticks from the inbound staging area at a first pick up rate equal to the cumulative inbound rate. The transfer head also places sticks of can ends in the outbound staging area at a placement rate equal to the cumulative outbound rate. The controller and apparatus balances the pick up rate with the placement rate by directing the transfer head to additionally transfer a sufficient number of groups to and/or from storage so that a desired regulated flow is achieved or maintained by the overall operation.

In accordance with this apparatus, the storage tray conveyor and respective magazines permit continuous regulated flow to occur even when one of the work stations is experiencing interrupted operation for a significant time period. In a start-up sequence, for example, a supply of empty storage trays equal to a maximum number of trays that can be handled by either of the magazines is loaded into the empty tray magazine. The transfer head is programmed to load each stick of can ends arriving at the inbound staging area into a receptacle portion or trough in a storage tray. Accordingly, a first empty tray is deployed from a stack of empty trays in the empty tray magazine onto the horizontal crossfeed conveyor. The tray is moved to the transfer station and then indexed therethrough as the transfer head places sticks of can ends one stick at a time into a receptacle trough portion. This series of steps is repeated until all of the receptacle portions of the storage tray are filled. Thereafter, the filled tray is moved by the conveyor to the filled container magazine. At the filled container magazine, a lift engages the bottom of the filled storage tray and raises it to an extended position. Thereafter, holder fingers are actuated to an inwardly extended position wherein the fingers are located under the edges of the storage tray. The holder fingers may also be actuated to a retracted position out of the path of the lift area. The lift mechanism is lowered and the tray rests on the extended holder finger supports in a raised and stored position in the magazine spaced above the crossfeed conveyor. This start up sequence is repeated until all the trays are filled and all but one tray is loaded into the filled tray magazine.

In accordance with the apparatus and method described in this patent, a fixed number of storage trays may be shuttled back and forth between the filled container magazine and the empty container magazine, as required in operation. The apparatus described in U.S. Pat. No. 4,808,057 was designed for use in can end manufacturing systems having operating rates of between about 2,000 to about 4,000 ends per minute. Typically, ends are stamped in a stamping press and are then passed through curly rollers to impart the curled peripheral lip portion. Good operating rates with these systems are generally from about 2500 to 3,000 ends per minute.

More recently, advances have been made in the stamping and forming operations. More particularly, new and improved end die presses have been developed which stamp the can ends from rolled stock and simultaneously provide the peripheral curled lip portion in a single stroke of the stamping die. These newer die curl presses are running at 250 strokes per minute and are expected to be able to perform at rates of 300 to 350 strokes per minute in the very near future. In this modern manufacturing context, a typical die may produce 28 can ends for each stroke and at an operating rate of 300 strokes per minute, the modern stamping operations are expected to be producing at least about 8,400 can ends per minute.

This four-fold increase in production rate must be matched or accommodated by the operating rates and capacities of the automated workload balancers required between workstations in the production line. Pressures to improve the operating rates of each successive workstation has also been prompted by this improvement in stamping operations. The balancer described in the above-mentioned patent and patent application has a practical upper limit of about, an operating rate of about 4,500 ends per minute, which rate is insufficient for more modern manufacturing operations.

Accordingly to overcome the limitations of the prior art automated balancer apparatus, it is an object of the present invention to provide a new and improved automated workload balancer apparatus capable of accommodating operating rates above about 5,000 ends per minute and preferably between about 7,500 to about 10,000 ends per minute.

It is another object of the present invention to provide a new and improved large capacity automated balancer having a virtually unlimited supply of filled and/or empty storage tray containers.

It is a further object of the present invention to provide a new and improved automated workload balancer having an improved transfer station including an increased number of lanes of increased length and a new and improved transfer head assembly having an expanded range of reciprocal movements.

SUMMARY Of THE INVENTION

In accordance with these and other objects, the present invention provides a new and improved automated workload balancer for automatically regulating a flow of articles between a first work station whereat a plurality of strings of articles are produced at a first variable cyclic operating rate, and a second downstream work station whereat an operation is performed on said plurality of strings of produced articles at a second variable cyclic operating rate, such that at least one of said work stations may continue in uninterrupted operation and at a desired operating rate when the rate of operation of the other work station is temporarily varied or interrupted.

The automated balancer comprises a transfer station, which may generally be considered to be a raised elongate horizontal planar location having a longitudinal axis extending parallel to the floor upon which the apparatus rests. An inbound staging area is provided at the transfer station, whereat a plurality of pre-formed groups of said produced articles, e.g. sticks of can ends, are temporarily accumulated prior to transfer. The inbound staging area includes a plurality of inbound lanes, each lane being adapted to receive a succession of the aforesaid groups of articles.

The apparatus also includes an outbound staging area at the transfer station. The outbound staging area is the area at which groups of produced articles are temporarily accumulated prior to advancement to the downstream or second work station. The outbound staging area is also defined by a plurality of outbound lanes, with each lane being adapted to receive a succession of the groups or sticks or articles.

At least one storage tray load/unload area is also provided at the transfer station adjacent the inbound and outbound staging areas. A transfer head is provided at the transfer station which includes means for gripping and releasing a group or stick or articles. In accordance with this invention the transfer head is positioned above the areas of the transfer station and is independently reciprocally movable along a longitudinal axis extending parallel to the longitudinal axis of the transfer station. The gripping and releasing means on the transfer head includes gripping jaws which are reciprocally movable in a vertical direction including a lowered or extended position at the transfer station and an upwardly retracted raised position spaced above the transfer station. The transfer head and gripping jaws are free to travel above the lanes extending along the longitudinal axis of the transfer station including the lanes at the inbound staging area, the lanes at the outbound staging area or the lanes formed by the stick receiving receptacle groove portions defined in each storage tray when the storage tray is in its load/unload position at the transfer station.

In accordance with the present invention, the apparatus includes means for handling groups of storage trays, to provide a virtually endless storage area. More particularly, in accordance with this aspect of the invention, storage trays are provided to the balancer in a pallet storage assembly. The pallet storage assembly includes a pallet support having an upper tray-receiving surface with tray engaging and positioning projections extending upwardly and outwardly therefrom. A plurality of telescopically cooperatively interfitting vertically-stacked storage trays are positioned on the pallet support. The lowermost tray includes features for cooperating with the positioning projections on the pallet to securely affix and orient the telescoping vertical stack of trays onto its associated pallet support. Each tray also includes a plurality of parallel, spaced apart group receiving receptacle portions or troughs defined in a recessed top surface portion of the tray.

The new and improved balancer apparatus of this invention further includes at least one pallet feeding assembly including an empty pallet staging area, a filled pallet staging area and a pallet elevator subassembly. The pallet elevator subassembly includes a vertically extending elevator shaft, perpendicularly intersecting the horizontal longitudinal axis of the transfer station. A pallet receiving platform lift is provided for selectively, reciprocally moving a pallet and its associated storage trays in either upward or downward vertical direction within the elevator shaft. The pallet lift is movable between a raised or upper empty pallet receiving position and a lower or downward full pallet receiving position. The pallet lift is selectively positionable at various intermediate heights in the elevator shaft so that an uppermost tray carried by the pallet is positioned in the transfer station which extends into the elevator shaft to align the receptacle portions of the tray with the longitudinal axis of the transfer station.

The empty pallet staging area and the full pallet staging area are each defined by elongate rigid generally rectangular frame members having pallet roller supports and pallet guide rails extending the length thereof. Each pallet staging area extends normal to the elevator shaft and has a forward feeding end adjacent a pallet receiving position defined in the elevator shaft and an opposed rearward loading/removal end, whereat a fork lift may be used to add or remove empty or filled pallet storage subassemblies into or out of the pallet staging areas. Each of the pallet staging areas are provided with a pallet shuttle chain drive for moving a pallet and its associated trays into or out of the elevator shaft. Preferably, the empty pallet staging area and the filled pallet staging areas are vertically aligned with each other and extend normally in over and under relation from the same side of the elevator shaft to conserve floor space. The length of the pallet staging areas may be varied to accommodate any desired number of pallets. Typically, each pallet storage area is provided with a length which is at least two times the length dimension of the pallet storage assemblies, so that at least three pallet assemblies may be put to continuous use.

The elevator subassembly, in addition to the lift means also includes cooperative empty tray support fingers adapted to hold the empty storage trays above the transfer station until each tray is indexed through the transfer station by the pallet lift assembly.

In accordance with the invention, the new and improved high capacity balancer also includes a plurality of sensors and detectors and interactive controller means for coordinating the movements of the various parts and operative subassemblies in the overall apparatus.

In accordance with the new and improved balancer operation, a plurality of strings of stamped and formed can ends or other manufactured articles are fed from the first work station toward the inbound staging area in plural inbound feeder lanes. A leading portion of each string in each inbound feeder lane is subdivided to define a group or stick of can ends or articles from the remainder of the string. The leading portion may be subdivided by successively counting off a predetermined number of articles or by successively measuring of a predetermined leading length along the string of articles to form the stick.

Each group of articles is separated from the remainder of the inbound string by advancing the group to the inbound staging area as the next succeeding group is being formed. A detector and controller means continuously determines a cumulative inbound rate equal to the rate at which successive groups in the plural lanes are being advanced into the inbound staging area.

The transfer head is used to remove groups of articles from the inbound staging area, one lane at a time, at a pick-up rate substantially equal to the cumulative inbound rate. The transfer head is also used to transfer groups of articles, one group at a time, to an outbound lane in said outbound staging area at a placement rate. Article groups are withdrawn from the outbound staging area by moving each group along an outbound lane to said second downstream workstation, the moving step includes the step of consolidating successive groups to re-form a string of articles in each outbound lane.

A cumulative outbound demand rate is monitored and determined in the apparatus which is equal to the rate at which groups of articles must be withdrawn to provide a sufficient supply of articles to maintain a desired rate of operation at the second work station.

The transfer rate is adjusted so that the placement rate is substantially equal to the outbound demand rate. The balancer control balances the pick-up rate with the placement rate by directing the transfer head to additionally transfer a sufficient number of groups to and from a storage tray, so that the desired regulated flow is achieved.

In accordance with the present improvement, the present invention directs the lift to position a pallet storage assembly in the elevator so that an empty or filled storage tray is positioned in the transfer station within the reach of the transfer head. Further in accordance with the invention, means are provided for moving a pallet storage subassembly in the elevator shaft to the appropriate empty or filled pallet staging area adjacent to of the elevator shaft and for introducing another filled or empty pallet storage subassembly, as required from its respective staging area into the elevator shaft for movement of individual trays into and through the transfer station.

As will be appreciated by those skilled in this art, at operating rates of above 5,000 ends per minute, if a second work station is temporarily shut down for any reason, all of the groups from the inbound staging area will be placed directly into a storage tray at the transfer station, and each tray will be filled up very quickly. Accordingly, the present invention provides an apparatus and method for managing the flow of groups of groups of the storage trays for handling by providing the pallet storage assemblies and thereafter by managing the flow of these pallet storage assemblies through the staging and elevator areas.

Other objects and advantages provided by the present invention will become apparent from the following Detailed Description of the Drawings in which:

BRIEF DESCRIPTION OF THE DRAWINGS

FIG. 10 shows the finger actuator means for maintaining a preformed stick of articles in stick form at the inbound staging area awaiting transfer;

FIG. 11 is an elevated side view depicting the inbound staging area of the new and improved balancer apparatus;

FIG. 12 is an end view of the inbound staging area of the new and improved workload balancer of this invention with unrelated portions of this apparatus cut away;

FIG. 13 is an enlarged elevated side view partly in section showing the transfer head including the gripper release means for picking and placing sticks of articles within the automated balancer apparatus of this invention;

FIG. 14 is an elevated sectional view of the transfer head and the pick-up release means taken along view lines 14–14 in FIG. 13;

FIG. 17 is an exploded perspective view of a pallet storage assembly in accordance with the present invention showing the pallet support member and a plurality of telescoping vertically staked and inter-leaved storage container tray members including receptacle areas for receiving sticks of can ends in accordance with the present apparatus;

FIG. 18 is a greatly enlarged side elevation view partly in section showing the operation of the empty pallet support fingers which were designed to maintain the empty storage trays in a raised out of the way location out of the transfer station until needed for use;

FIG. 19 is a side elevation view illustrating a proximity sensor mounted within the empty tray support fingers for signaling when the uppermost tray in a pallet and tray stack has been lowered for use into the transfer station;

DETAILED DESCRIPTION OF THE INVENTION

Figure 1:
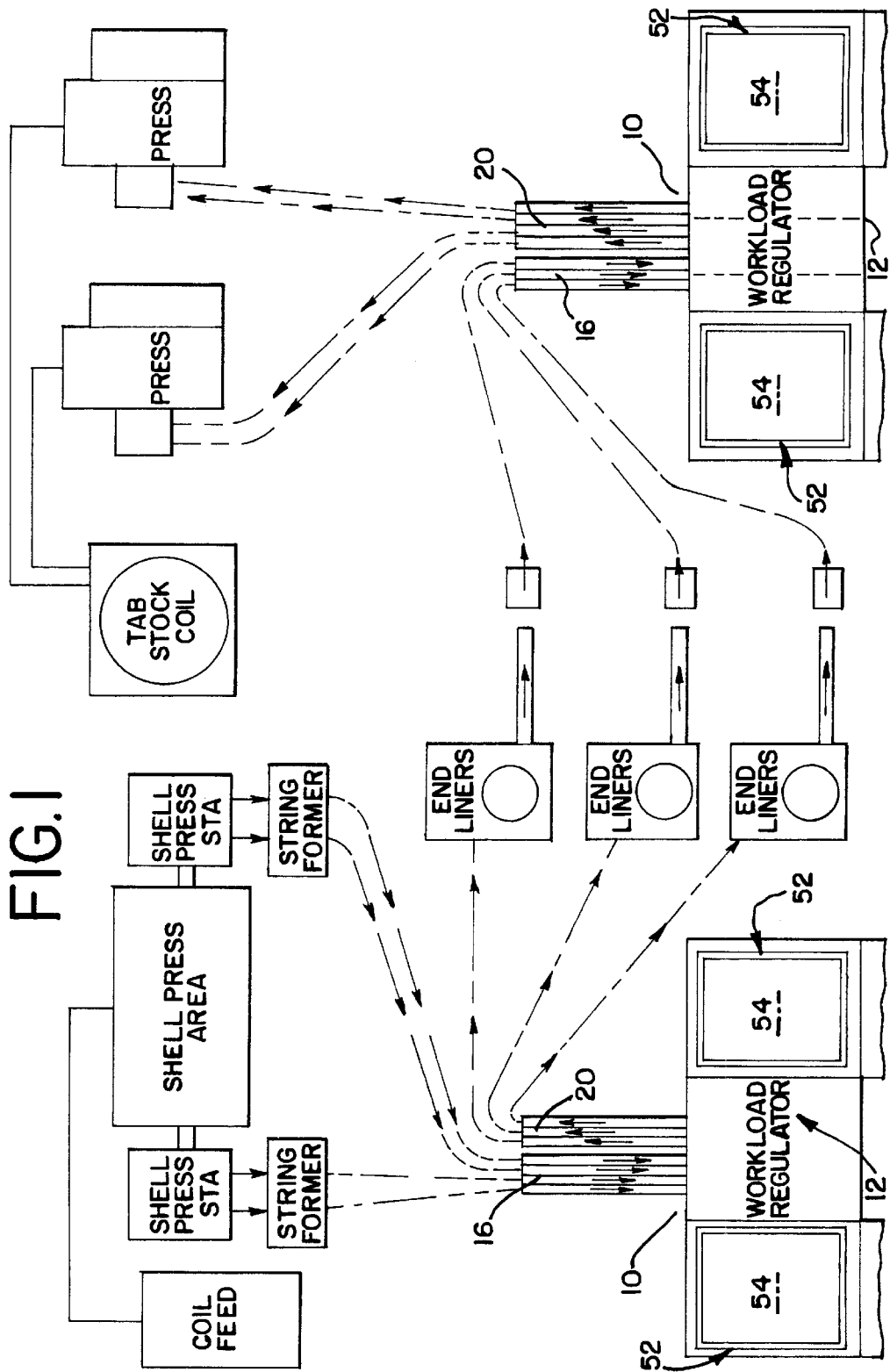
FIG. 1 is a schematic view of a context of use for the new and improved workload regulators 10 in accordance with this invention shown in connection with a can end processing chart.

Referring now to FIG. 1 a schematic illustration of the end forming operations is illustrated. As depicted in FIG. 1, a coil of sheet metal stock is stamped in a shell press area to form a plurality of can ends. These are fed from the shell press into a string former which forms them into a continuous string of ends which is fed along inbound feeder lanes into an inbound staging area of the new and improved workload balancer 10 of the present invention. The workload balancer 10 first separates sticks of articles from the incoming feed and advances them into an inbound staging area of a transfer station. A plurality of lanes for receiving outgoing sticks of articles is provided in an outbound staging area within the balancer device. These ends are accelerated out of the outbound staging area through a string reforming mechanism to form continuous string beads of can ends which are fed to a liner second work station. The lining secondary work station applies curable resin compositions to the inside of the lid for sealing it to the bottom portion of the beverage can and subsequent operations. In accordance with the present context, the balancer must continuously determine the cumulative inbound rate at which can ends are being advanced from the shell press area into the workload balancer. It must also determine the demand rate out required to keep the end liner secondary work station functioning and it must meet the demand out by placing sticks of can ends in the outbound lanes and advancing them from the outbound staging area into the outbound feeder lanes. Any difference between the cumulative inbound rate and the outbound demand rate must be made up by the workload balancer going to or from storage to find additional sticks or groups of articles for placement into the flow of the system to keep both Workstation 1 or Workstation 2 operating at a desired rate. As shown in FIG. 1 after the liner operation, the ends may be reformed into strings and fed into a secondary workload balancer in preparation for sending them on their way to conversion presses where score lines and pull top tabs are added to the can ends before they are subsequently stored for future use.

Figure 2:
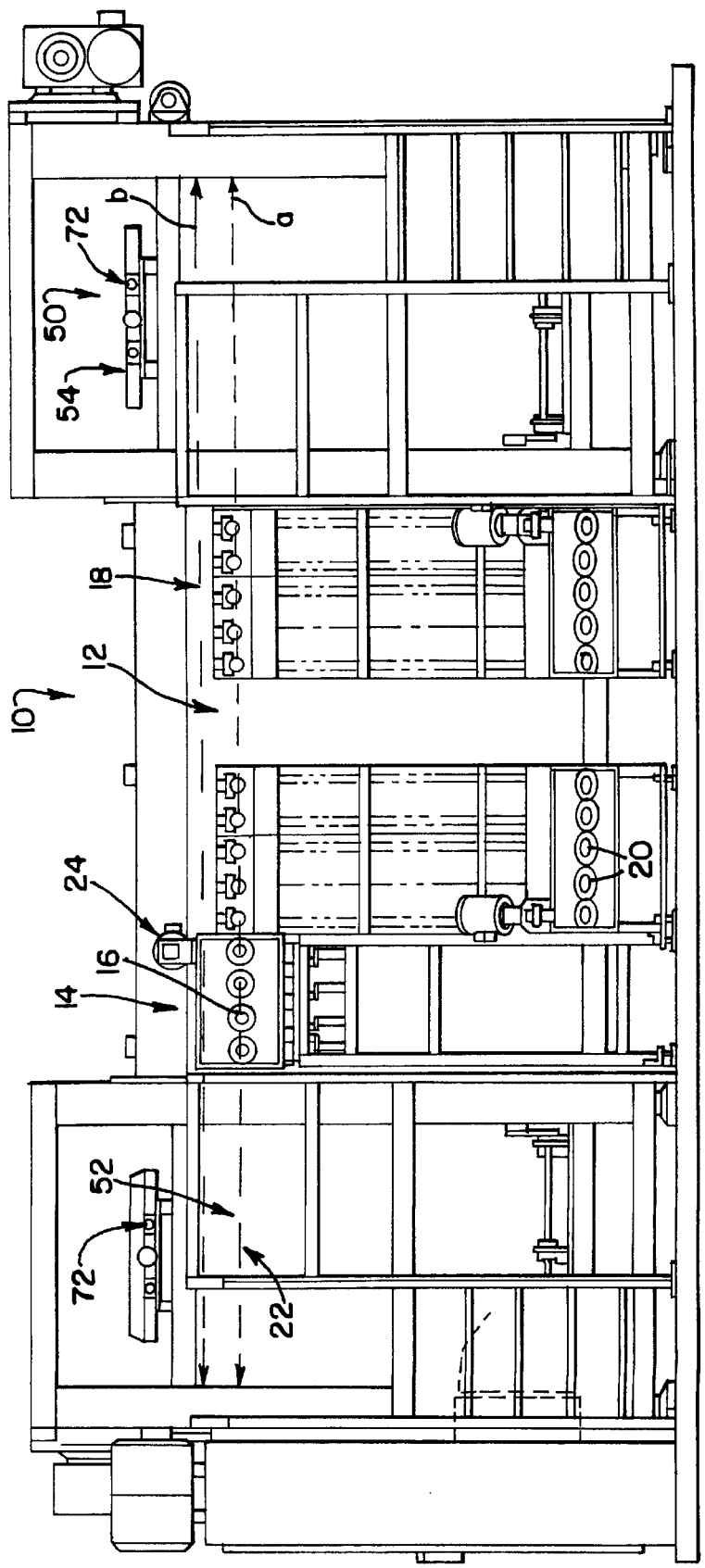
FIG. 2 is a front elevation view of the new and improved high capacity over and under workload balancer in accordance with the present invention.

Referring now to FIG. 2, the new and improved preferred embodiment of the over and under high capacity workload balancer apparatus 10 is shown. The balancer includes an elongate transfer station 12 extending from a first elevator shaft area 52 in the right hand elevator all the way into the right hand elevator 50. The transfer station is defined in part by a horizontal and longitudinally extending axis a extending through the apparatus and spaced at a raised location parallel to the floor upon which the apparatus rests. In addition to the elevator shafts areas which are associated with a pallet storage assembly and pallet feeding assemblies and inbound staging 14 is located along axis A in the transfer station as well as an outbound staging area 18. In the preferred embodiment depicted in FIG. 2, four inbound lanes 16 feed continuous strings of can ends into the transfer station. Before they reach the transfer station they are subdivided into sticks of can ends and are acceleratedly advanced into lanes forming the inbound staging area. A second plurality of outbound lanes numbering 10 in total number exit from the central portion of the balancing apparatus 10. The reciprocating transfer head 24 is capable of reciprocal movement along an axis B extending parallel to axis A and vertically spaced upwardly from it. The transfer head includes gripper stick gripping and releasing jaw means and the transfer head is movable from the left hand elevator shaft to the right hand elevator shaft.

Figure 3:
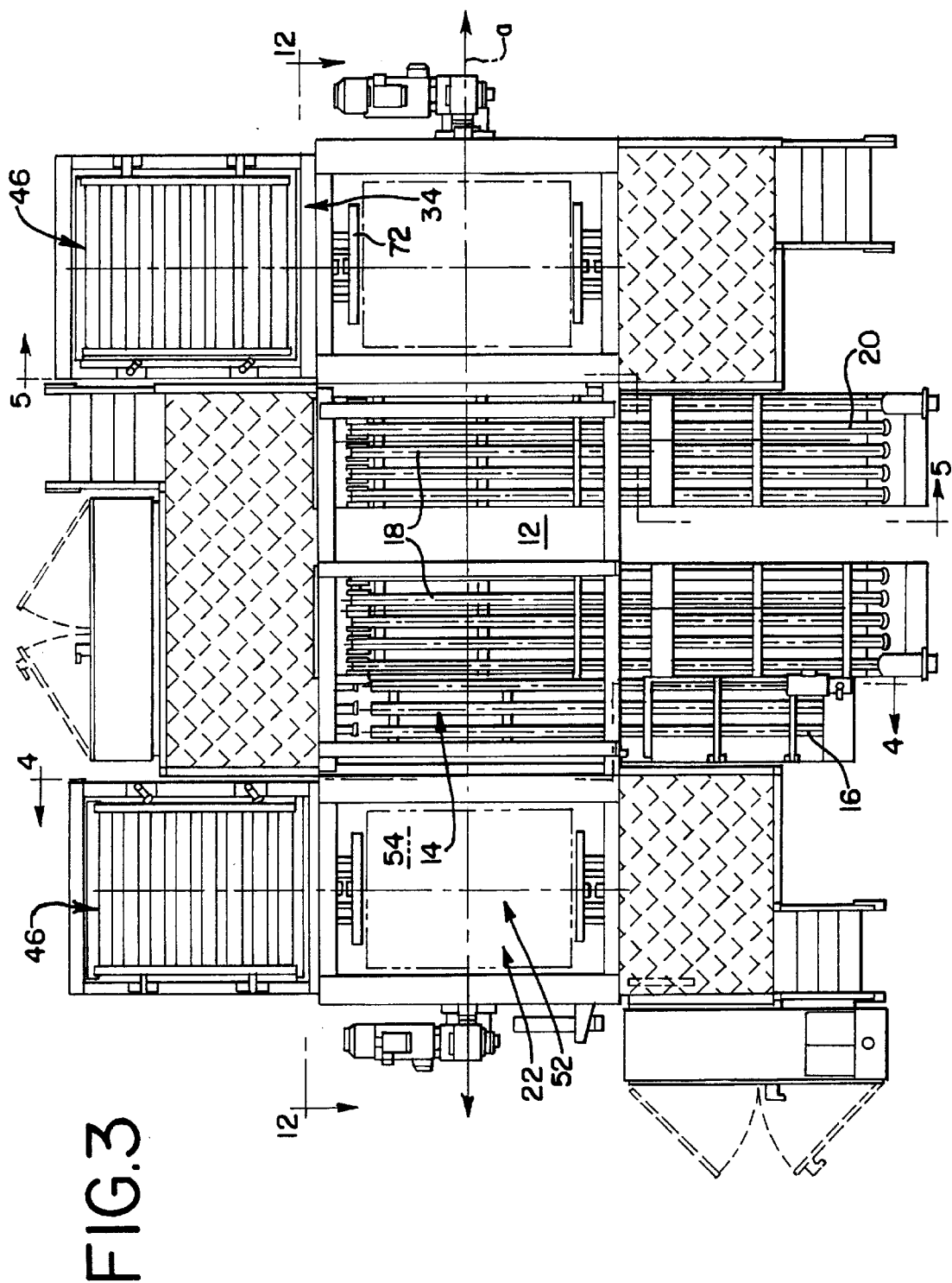
FIG. 3 is a top plan view of the new and improved high capacity workload balancer of this invention.

Referring now to FIG. 3, a top plan view of the new and improved high capacity over and under balancer is shown. As depicted therein, the transfer station is shown to include the inbound staging area comprising four lanes. The outbound staging areas comprising 10 lanes and a leftward and rightward elevator shaft located on either side thereof the central portion of the apparatus. Extending normally rearwardly from the elevator shafts are pallet staging areas which feed pallets containing groups of storage trays into an elevator. The elevator assembly moves individual trays located or associated with a given pallet and a stack of telescopingly interfitting storage trays located on that pallet vertically into and out of a lines position with respect to the transfer head and the other elements of the transfer apparatus.

Figure 4:
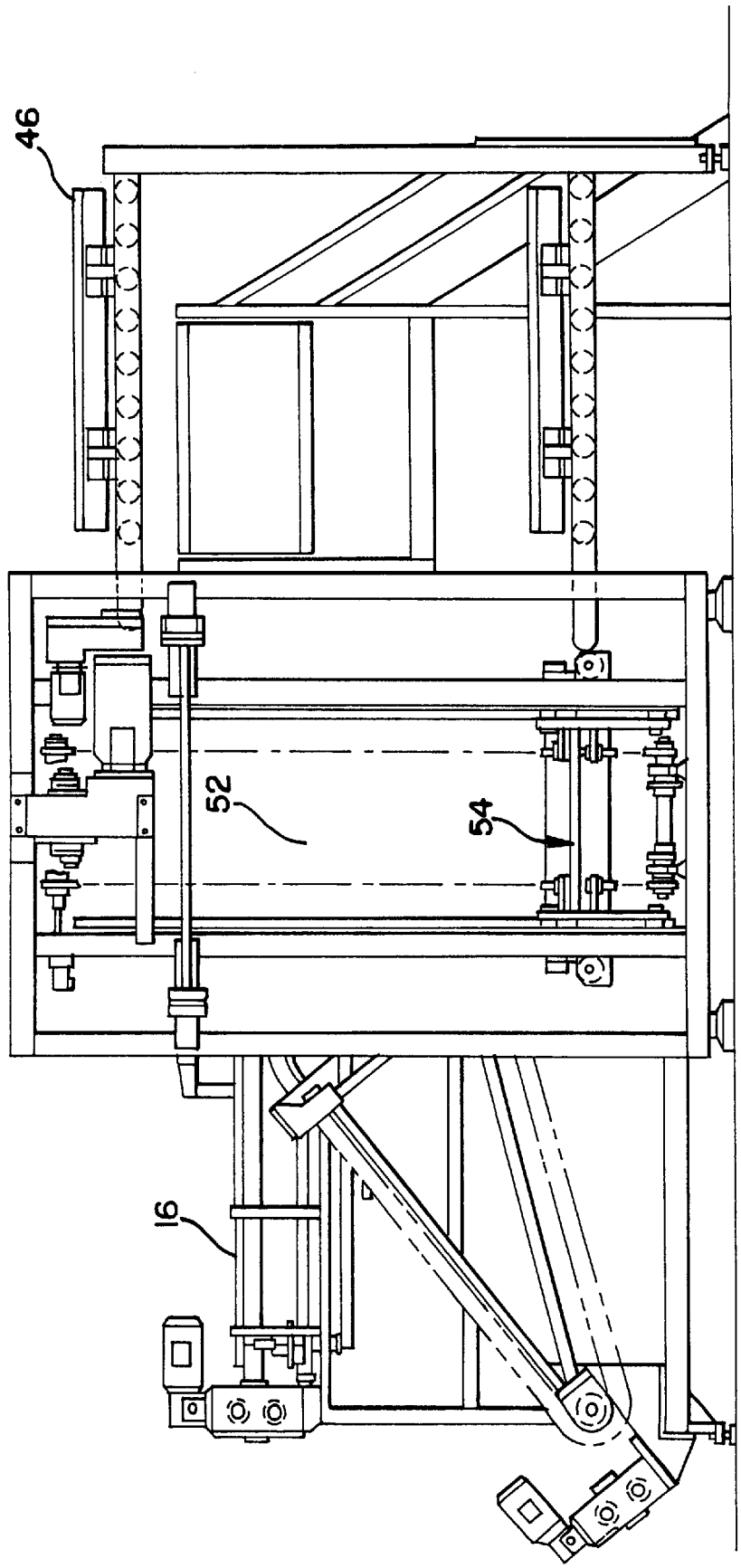
FIG. 4 is a side elevation view of the new and improved workload balancer of the present invention taken along view lines 4—4 in FIG. 3.
Figure 5:
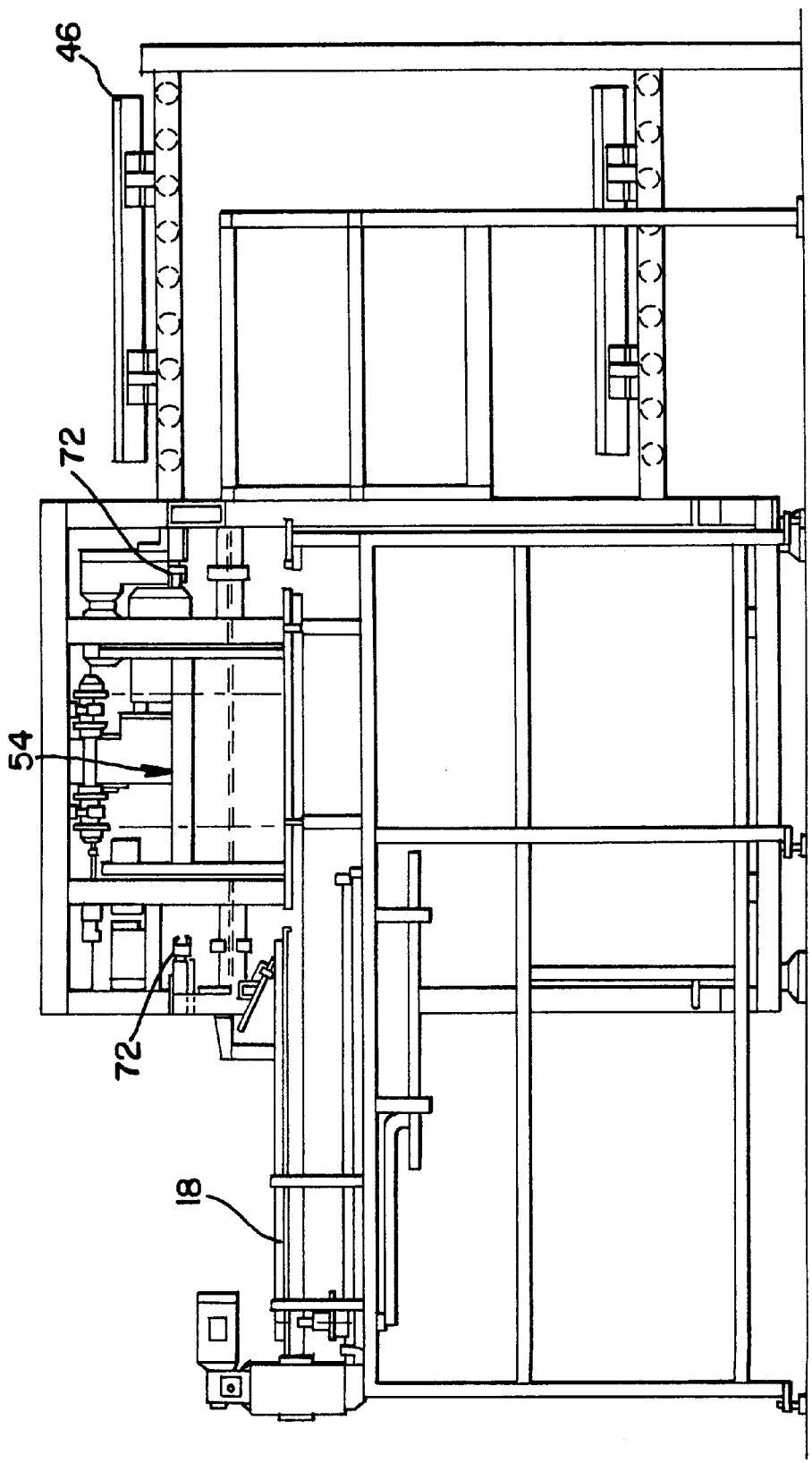
FIG. 5 is an elevated side view of the new and improved workload balancer of the present invention taken along view lines 5—5 in FIG. 3.

Referring now to FIGS. 4 and 5, the operation of the pallet feeding assemblies and the pallet elevator subassemblies may be appreciated. The upper pallet storage area is an empty pallet staging area for receiving a pallet having a stack of empty storage trays thereon shown at 46. Pallet feeder means in the form of a shuttle chain drive are provided in the upper empty pallet staging area to drive the pallet forwardly into the elevator shaft area wherein it is received on a lift platform. The upper surface of the lift elevator platform has chain moving members to ensure that the incoming pallet and its associated storage trays are properly centered and positioned within the elevator shaft area. Appropriate proximity and optical sensors may be used to guarantee proper positioning of the pallet and its associated trays. In an upward area within the elevator shaft. The lift platform is actuated downwardly through the transfer station to position receptacle portions in each of the storage trays in alignment for receiving sticks of can ends from the transfer head moving along the transfer station within the device. After each tray is filled or emptied, the lift platform is moved upwardly and empty tray support fingers shown at numerals 72 in FIG. 5 are actuated as required. The lift platform moves the pallet and the trays upwardly and downwardly successively aligning empty or filled trays in the transfer station in each elevator shaft as needed until either completely filled or completely empty trays extend above the upper surface of the pallet member. Thereafter, the chain drives in the upper surface of the lift platform may be actuated to drive the pallet member into the empty pallet staging area or the filled pallet staging area to remove it from the elevator shaft and the operative use therein. This will be more completely described hereinafter.

Extending vertically perpendicularly and intersecting the horizontal axis a of the transfer station. The opposed ends of the transfer station therefore extend into the elevator shaft regions define a storage tray load and unload area indicated at 22 outwardly adjacent the inbound staging area and the outbound staging area. In the front elevation view shown in FIG. 2, the pallet feeding assembly is partially indicated. Each elevator includes a pallet lifting assembly with drive means for raising and lowering the platform the pallet riding on the platform and a number of storage trays riding on the pallet upwardly and downwardly within the elevator shaft. Left hand and right hand stairs are shown rising to an observation platform for an operator to stand on and observe the operation of the apparatus in use.Reciprocal empty trays support fingers 72 are shown in their position in FIG. 2 to be particularly discussed hereinafter.

Referring now to FIG. 3 a top plan view of the new and improved workload regulator 10 of this invention is shown. The inbound lanes 16 are seen to lead into the inbound staging area 14 which includes a plurality of lanes adapted to receive sticks of can ends awaiting transfer within the device. The outbound staging area 18 includes ten lanes which lead to twenty outbound lanes as shown. The left hand and right hand elevator shafts along longitudinal axis a are clearly depicted in their lateral positions within the overall elongate transfer station 12. Extending perpendicularly rearwardly from each of the elevator shafts is shown a pallet storage assembly 34. Each including guide rails for properly positioning the pallet containing the storage trays and each including special proximity sensors to correctly ascertain the proper positioning of each pallet and therefore support trays prior to their entry into the elevator shaft. A pallet rides on chain driven rollers into and out of the elevator shaft area at the shaft area. Adjacent the elevator shaft area there is shown the front end of the pallet staging area the opposed rear loading end of the pallet staging areas are provided with clearance so that a fork lift operator can semi automatically load or unload a filled or empty pallet containing a large number of storage trays onto or off of this pallet staging location.

Referring now to FIG. 4 a side elevation view of the workload regulator apparatus 10 is shown. The left hand side of the drawing shows the inbound and outbound lanes feeding into the transfer station 12. The central portion of the figure shows the elevator shaft areas and the elongate transfer station extending into and out of the page along longitudinal axis a. A pallet lift is shown in a lowered position within the distant elevator shaft adjacent the lower filled pallet staging area on the right hand portion of the drawing shown in FIG. 4 the upper empty pallet staging area and lower filled pallet staging areas are shown extending normally rearwardly over and under relation from the same side of the elevator shaft of the device.

Referring now to FIG. 5 is a similar elevated and side view of the device showing the inbound staging area actuator positioner fingers for holding a stick of articles in the transfer station and in the background there is shown the empty tray support finger 72 which are extensible inwardly to maintain a plurality of stacked empty trays above the transfer station and reciprocal path of movement for the transfer head apparatus 24. The inbound land feeder and string splitter and group forming apparatus are shown at the central left hand portion of the drawing and on the right hand portion of the drawing are the upper over and under pallet staging areas extending from the elevator shaft.

Referring now to FIGS. 6–14 various detailed aspects of the balancer apparatus are shown. Many of these operative elements are identical or similar to those described in a related pending application Ser. No. U.S. 449,311 filed Dec. 8, 1989 and entitled Apparatus And Method For Packaging Groups Of Articles, now U.S. Pat. No. 5,160,420. The description relating to each of the common features described in that application and shown in the selected FIGS. 6–14 are specifically incorporated herein by reference. Further details may be had by referring to that more complete disclosure.

Figure 6:
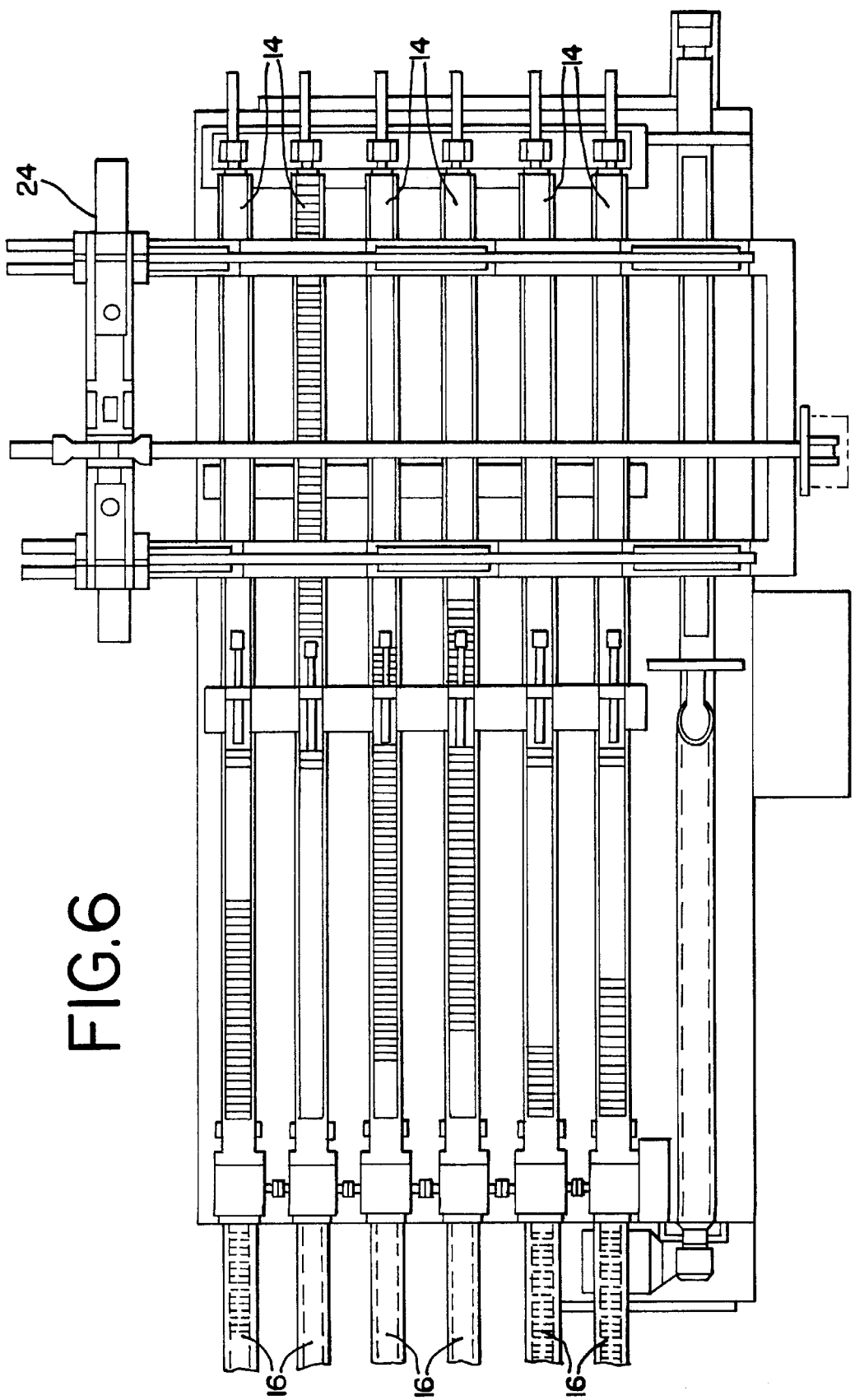
FIG. 6 is a top plan view illustrating the inbound staging area and inbound feeder lanes for use in connection with the over and under new and improved automated workload balancer of the present invention and showing the transfer head overlying the inbound staging area.
Figure 7:
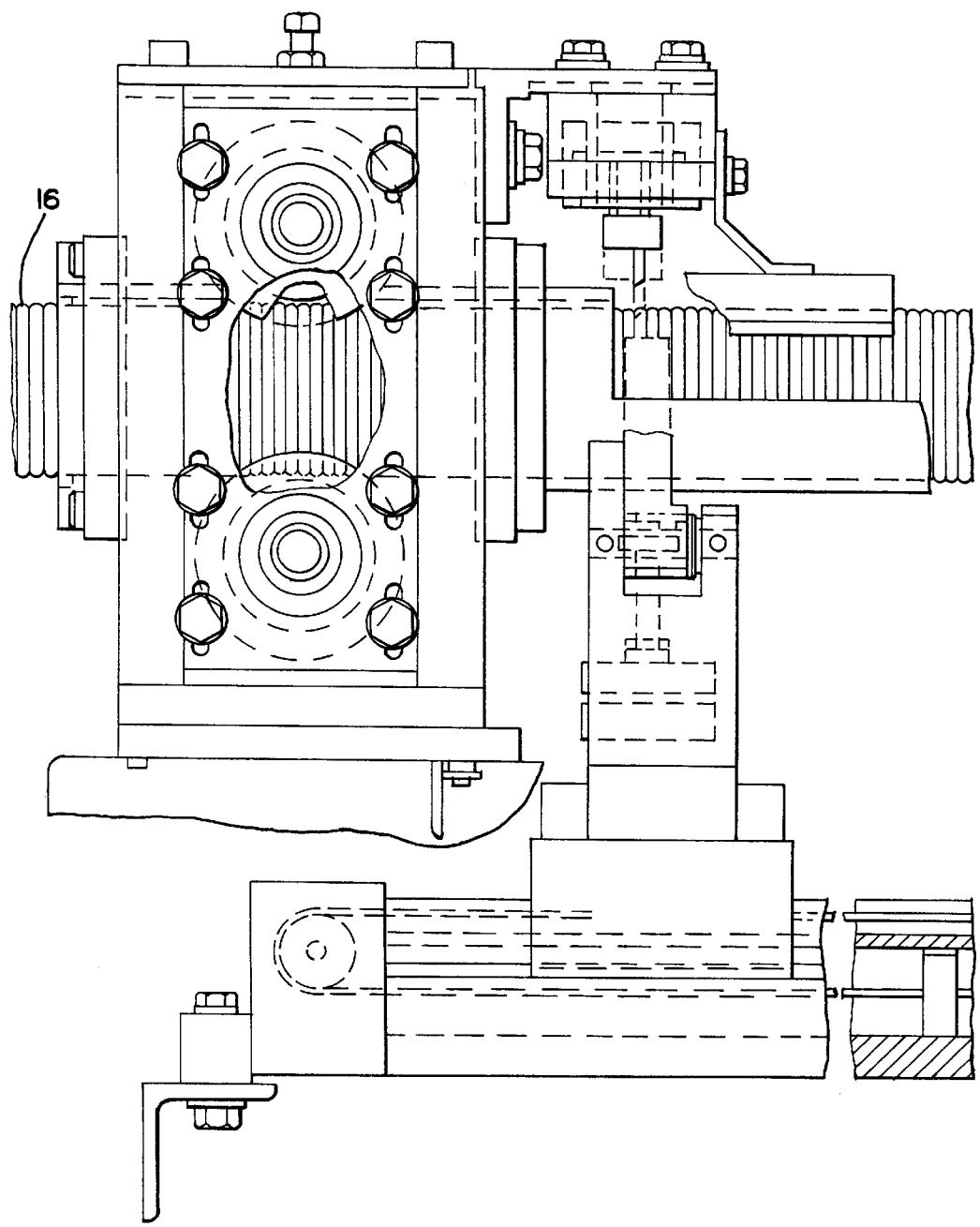
FIG. 7 is an elevated view partly in section showing the roller mover means for urging a string of can ends forwardly along the inbound feeder lanes and also depicting the means for separating a stick of articles into a group and for advancing it into the inbound staging area preparatory to transfer.
Figure 9:
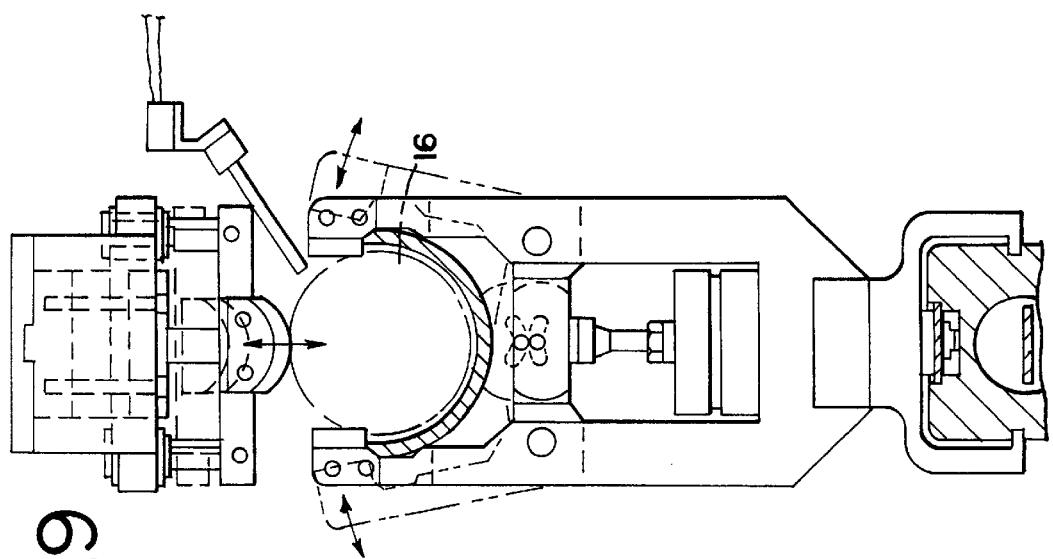
FIG. 9 is an elevated end view showing the string splitter and accelerator jaw arrangement for separating a preformed group of articles and advancing them into the inbound staging area.
Figure 7A:
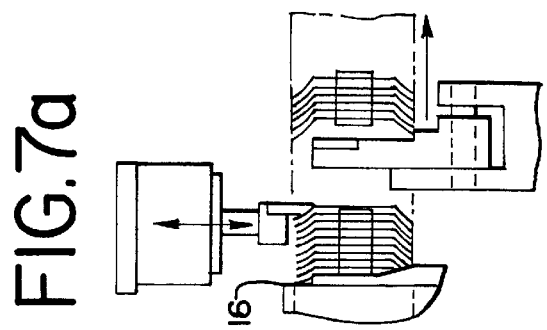
FIG. 7A is an enlarged detailed view illustrating the operation of the splitter arrangement and advanced accelerator jaws shown in FIG. 7.
Figure 8:
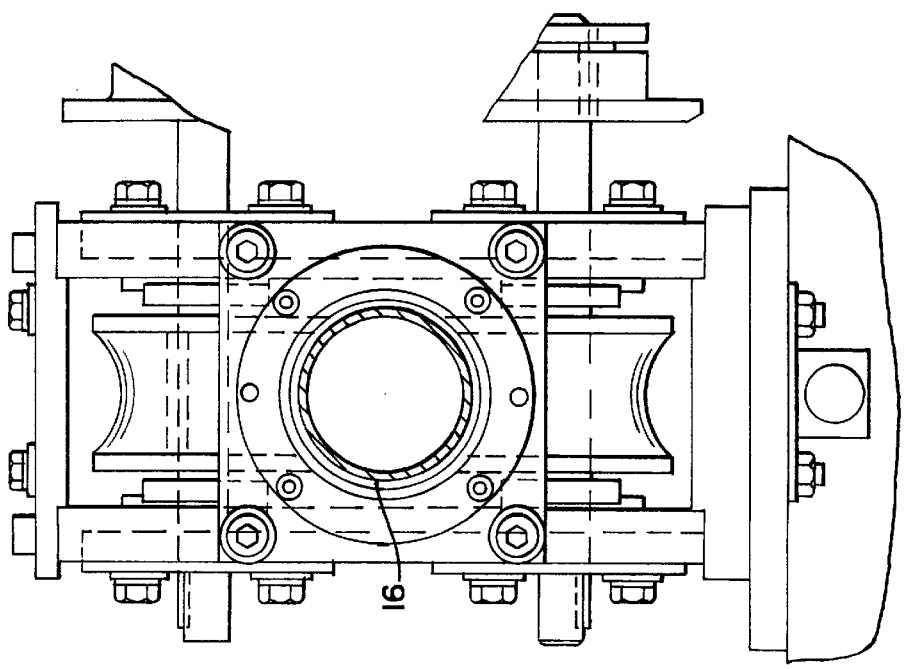
FIG. 8 is an end elevation view of the string mover means associated with the inbound lanes.

More particularly and briefly now in referring to FIG. 6 a top view of the inbound staging is shown. The guide rails for driving and moving the transfer head are shown at the right hand portion of the drawing intersecting the lanes comprising the inbound staging area. The right hand closed end portion of the incoming lanes include a forward stop in each lane indicated at the right hand portion of the drawing. Intermediate the lanes leftward of the transfer head are shown individually actuatable support fingers for holding the last article in a stick of articles just formed as shown in lane 2 to maintain the stick within the inbound staging area. Left of the actuatable fingers shown leftward of the actuatable fingers are the inbound lanes would successively advance a string of articles as shown in lane 1 by means of the roller pusher arrangement depicted more completely in FIG. 7. Referring now to lanes 3 and 4 a split stick of can ends is being acceleratedly advanced away from the remainder of articles in the group and into the inbound staging area. This apparatus is shown more particularly in FIGS. 7, 8 and 9. Each preformed stick of articles is maintained at the inbound staging area awaiting transfer by the transfer head. Appropriate sensor means are located in the zone to determine a cumulative inbound rate at which incoming articles are being split into groups and are being advanced into the inbound staging area. Referring now to FIG. 7, the mover roller assemblies for advancing the continuous string of can ends towards the inbound staging area is shown extending from the right hand side of the mover station is a splitter blade and an accelerator clamping jaws arrangement as depicted at the lower right hand portion. It is shown beginning to separate in advance a group from the remainder of the incoming feed. The lower portion shows a mounting block connected to a tape of a tollomatic cylinder which moves rightwardly or leftwardly as shown in FIG. 7. Referring now to FIG. 9, the tollomatic mounting block and tape are shown at the lower portion of the drawing mounted to the mounting block which rides along the tape and extending into inbound lane or straddling both sides of an inbound lane is shown the accelerator jaws which close inwardly to engage the edge portion of a can end and they are acceleratedly advanced into the inbound staging area. FIG. 10 shows the operation of the independently actuatable fingers for maintaining a stick of articles in the inbound staging area. FIG. 11 is an improved side elevation view indicating the inbound staging area with the other portions of the apparatus removed for clarity. FIG. 12 is an end view looking at the inbound staging area from the forward stop end which shows the lateral movement of the transfer head in a direction transverse to the length dimension of the inbound staging area lanes.

Referring to FIG. 13 a transfer head including the gripper end release means as shown the transfer head is driven by automatic cylinder along guide rails and includes a mounting block and pneumatic arrangements connected thereto for raising and lowering a gripper head which actually grips the stick of articles shown in the transfer station. The gripper mechanism is shown more particularly in the cross sectional view of FIG. 14.

Each of these views are described in greater in the above mentioned related pending application on the automated end packager apparatus which has been incorporated herein by reference.

Figure 15:
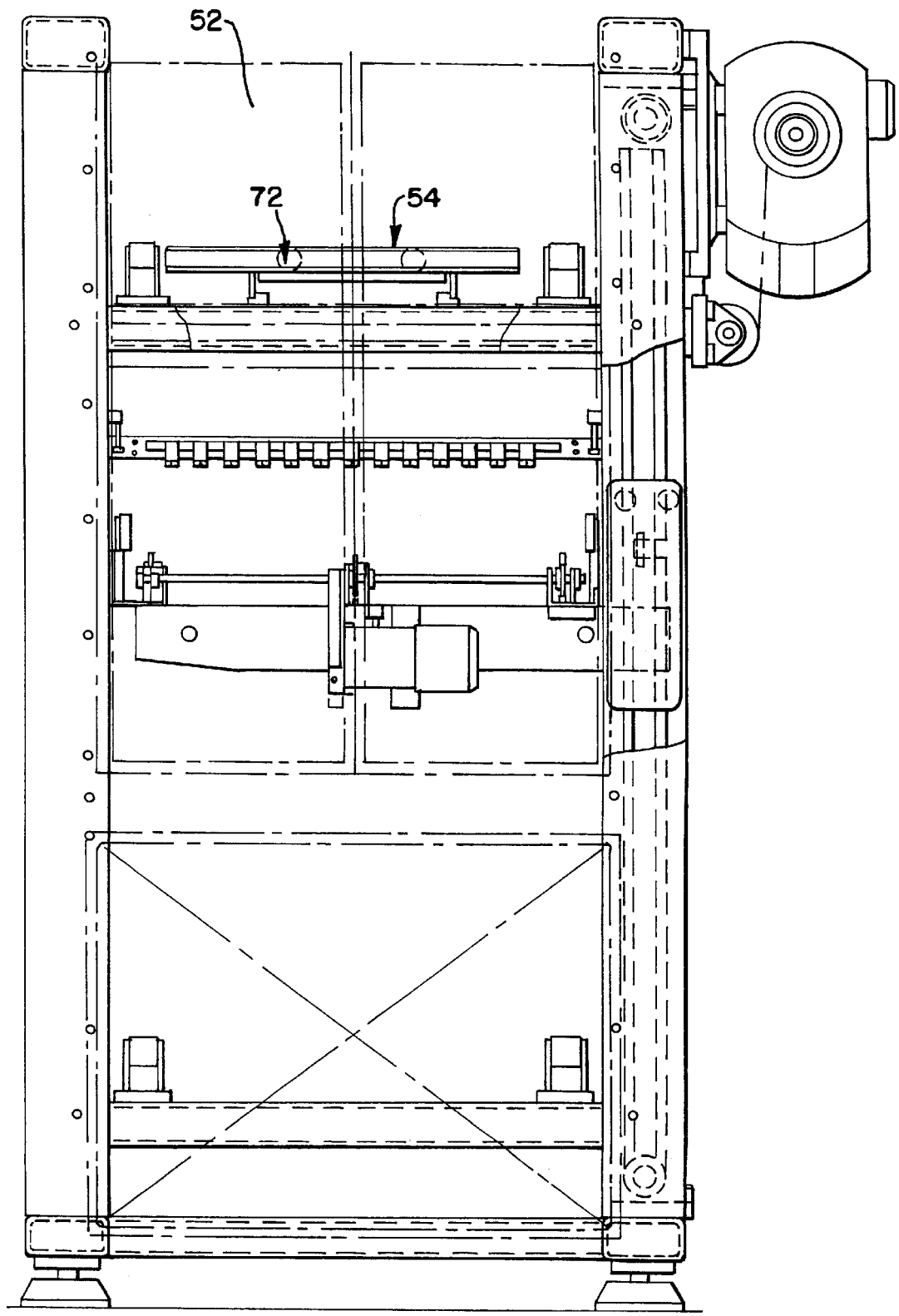
FIG. 15 is a front elevation view partly in section of the pallet elevator subassembly of the present invention showing the pallet lift platform and drive means.

FIG. 15 shows the pallet elevator subassembly 15 which includes an elevator shaft 52, a left 54 including a lift drive mechanism shown at the right hand portion of the drawing on the upper portion of the pallet receiving surface of the platform there is shown three chain drives for urging the pallet and its associated storage trays into or out of overlying engagement with the platform lift some lateral guides and sensors are depicted in the drawing for properly assuring the positioning of the pallet and the trays on the left within the elevator station. Disposed above the platform is shown a mounted bar of sensors which are disposed along the storage tray load or unload area. Each of these sensors looks into an associated receptacle in a properly positioned storage tray at that location to determine whether that particular storage receptacle in the tray is filled or unfilled. The drive mechanism for the transfer head is shown immediately above and immediately above that is shown the empty pallet staging area. At the bottom portion of FIG. 15 are shown the roller guides associated with the filled pallet staging area. It should be understood that the transfer head translates leftward and rightward at a position between the sensored panel and the empty pallet staging area as shown in FIG. 15 without any interference from any of the elevator subassembly elements.

Figure 16:
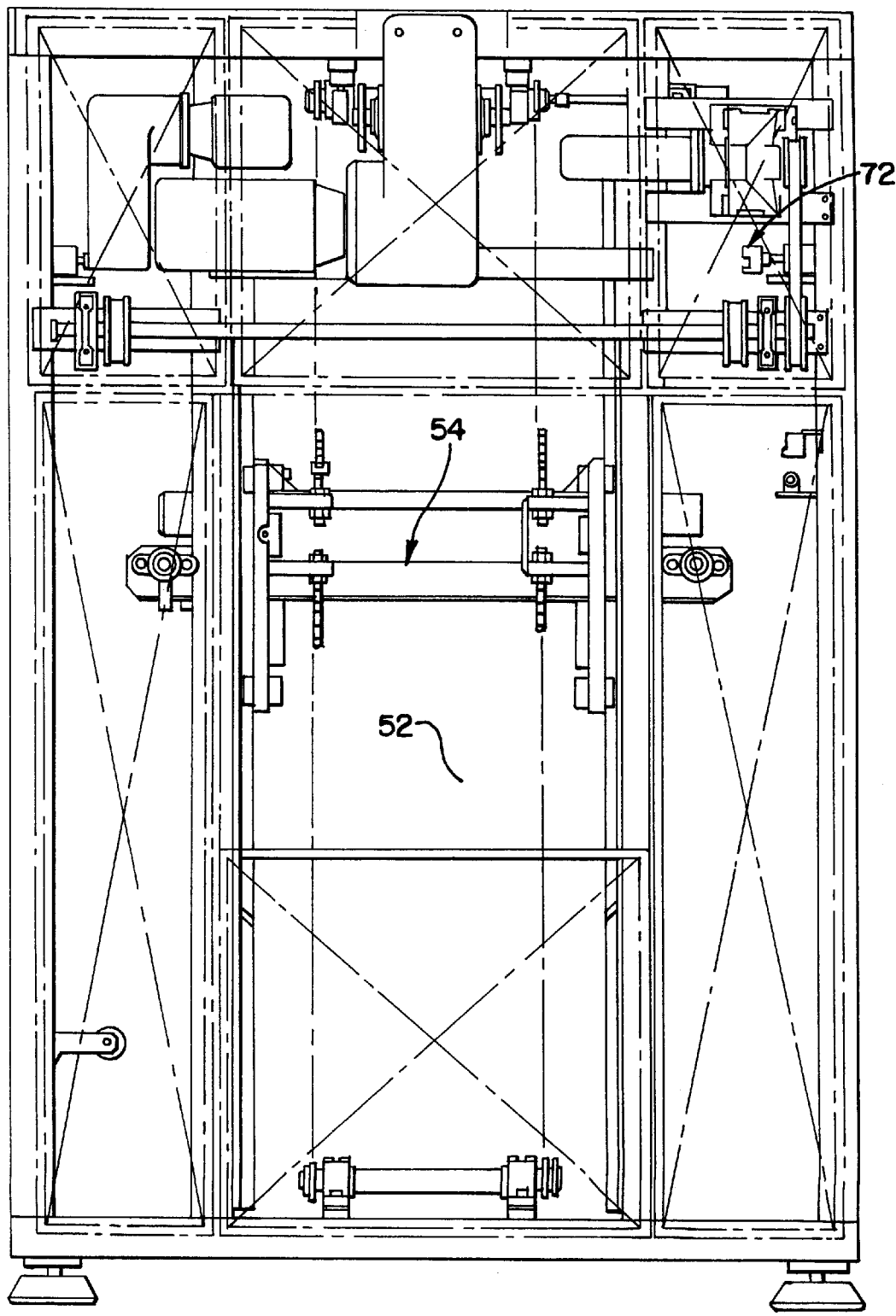
FIG. 16 is a side elevation view of the elevator subassembly for use in the present inventions.

Referring now to FIG. 16 a side view of the elevator shaft is shown with the platform of the lift shown in the intermediate position. At the middle right hand portion of the elevator shaft a number of positioning proximity sensors are depicted which assure proper positioning of the pallet and a pallet and trays riding on the lift within the elevator shaft. Above the platform are shown the inwardly reciprocably actuatable empty storage tray gripping finger members which engage a peripheral edge portion of a empty storage tray to maintain a stack of trays above the elevator shaft out of the path of movement of the transfer head until appropriate detectors and controllers signal the platform lift to rise up so that the filled or empty tray uppermost on the pallets riding on the elevator platform will rise up and engage the lower most empty tray gripped by the support finger at which point the support fingers will retract permitting the elevator, the pallet and the entire stack to move downwardly until the gripper fingers are actuated inwardly and the elevator continues its downward travel to position a new top most tray in the storage tray load unload area of the transfer station.

Referring now to FIG. 17 a pallet storage assembly is depicted including a pallet support member having tray engaging fingers projecting upwardly from an upper surface thereof which are adopted to cooperate with cooperating edge features on each tray so that the first loaded tray is firmly positioned on the upper surface of the pallet support. Thereafter, each of the trays have telescopically fitting structures to guarantee the vertical stacking arrangement of a number of storage trays on a particular pallet structure. It should be noted that throughout the operation of this device the pallet having a given number of trays associated with it will always have those trays associated with it. Once a tray has been associated with a pallet it will move through the apparatus in association with that pallet and no other pallet until it is removed from the overall apparatus.

More particularly in this regard, if a pallet having a stack of empty storage trays is introduced onto the upper empty pallet staging area shown in the side elevation views of FIGS. 4 and 5 when empty trays are needed an appropriate control signal will cause the pallet with the empty trays to move forwardly or leftwardly as shown in FIG. 4 into the elevator shaft area onto the upper surface of the platform so that the pallet rests on the chain conveyors defined in the upper portion of the elevator or lift platform. The support fingers 72 will be actuated inwardly to engage the next to last tray or second up from the upper surface of the pallet which the pallet and the lower most tray are permitted to descend on the lift into the operative storage tray load and unload area associated with the transfer station. As soon as that lower most tray becomes filled, the entire elevator lift rises so that the filled tray engages the next to the last empty tray which was gripped in the gripper fingers. The gripper fingers are actuated to an outward disengaged position and the entire stacked of trays is actuated downwardly one incremental distance. Thereafter the gripper fingers are moved inward to engage the third tray and the filled first tray and empty second tray are lowered into use. This process is repeated until all of the trays associated with that pallet have been filled with can ends. Thereafter if a signal indicates that further empty tray storage is needed, the lift will be actuated to the downward filled pallet unload position. The three chain drive conveyors located on the upper surface of the lift platform will force the pallet towards the filled pallet staging area until the chain driven rollers in the filled pallet staging area engage the lower surface of the pallet will drive the filled pallet and its filled trays rightwardly as shown in FIG. 4 until the pallet and the filled trays are located in the filled pallet staging area after having been appropriately aligned by the guide rails and the associated roller supports. Various proximity and optical centers may be provided to ensure proper orientation of each of the trays and appropriate movement into and out of the elevator shaft area. Thereafter the upper empty pallet staging area conveyors will be activated to feed another empty pallet with empty storage trays stacked thereon into the upper portion of the elevator shaft area. If no empty pallet and trays are in the empty pallet staging area, an appropriate alarm signal will sound indicating to an operator that a fork lifted supply of an empty pallet and trays should be added to the upper empty pallet staging area.

Although the preferred embodiment of the over and under balance apparatus 10 this invention shown in the detailed drawings includes a left hand and a right hand pallet feeding system. It will be understood to those skilled in this are that only one pallet elevator arrangement need be provided although the capacity will be diminished in these instances were only a left hand or a right hand elevator arrangement is provided in combination with balancer apparatus a series of stationery buffer stick receiving support or buffered lanes must be provided in the transfer station along axis a intermediate the inbound or outbound staging lanes and the storage tray load and unload area adjacent an elevator shaft area. The need to provide buffer lanes within the transfer station in a one sided elevator balancer is required because additional lanes at the high operating rate are needed when the pallet storage assembly is obtaining a new pallet and translating it downwardly along the elevator shaft into operating position. During the time that it takes to move the old pallet out of position and a new pallet into position the transfer head may need a buffer lane or two until the storage trays are available for placement.

The new and improved high capacity balancer of the present invention may have one or two elevator assemblies and may be provided with more than one transfer head moves along the transfer head path above the insertion station to provide operating speeds for the can ends through the apparatus of above 5,000 can ends per minute and preferably above 7,500 can ends per minute and especially preferably up to about 10,000 per minute.

Although the present invention has been described with reference to preferred embodiments, modifications or changes may be made therein by those skilled in this art without departing from the scope and spirit of this invention as defined in the appended claims.

We claim:

1. An apparatus for regulating a flow rate of a plurality of articles moving between an upstream work station serving as a source of supply for such articles and a downstream work station having a demand for such articles, said apparatus including an elongate raised horizontal transfer station having a longitudinally extending transfer axis associated therewith, means for feeding at least one continuous linear array of inbound articles from said upstream work station, means for subdividing said continuous linear array into individual groups of articles, means for successively accumulating a plurality of said individual inbound groups of articles intended to be fed downstream at said transfer station, an accumulator means for accumulating a succession of outbound transferred groups at said transfer station, means for advancing and consolidating said outbound groups into at least one re-formed continuous linear array of articles destined for said downstream work station, at least one storage and retrieval area in said transfer station aligned with said longitudinal transfer axis and adjacent said inbound and said outbound accumulator means, article group transfer means at said transfer station reciprocally movable along said longitudinal transfer axis and adapted to engage and transport said individual inbound groups of articles to said outbound accumulator means for advancement downstream, said article group means also being adapted to transfer selected groups of articles from said inbound accumulator means to storage container positioned at said storage and retrieval area and adapted to remove groups of articles from said storage and retrieval area in a storage container and transferring said groups of articles to said outbound accumulator means, said apparatus further including at least one storage container feeding assembly including a vertically extending elevator shaft perpendicularly intersecting the transfer station at said storage and retrieval area, said storage container feeding assembly further including an empty storage container staging area and a filled storage container staging area, each of said staging areas extending normally to said elevator shaft in spaced vertical relation to each other, a plurality of pallet subassemblies each including a pallet member having a plurality of vertically stacked storage containers on an upper surface thereof, each of said containers including a plurality of storage areas, said apparatus further including means for reciprocably advancing a pallet subassembly containing full or empty containers into said elevator shaft area, an elevator lift for reciprocably moving said pallet subassembly and its associated containers successively into and out of alignment with the storage placement and retrieval area of said transfer station, and control means adapted to control said article group transfer means so as to increase the rate at which the articles are being fed to said downstream station by adding groups of articles taken from said storage container to said groups being transferred from said inbound accumulating means, and for diminishing the rate at which articles are fed to said outbound accumulator means by transferring groups of articles from said inbound accumulating means to storage areas within successive storage containers, whereby a workload balancer apparatus having an expanded interactive buffer capacity is provided.

* * * * *